(12) United States Patent
Lacy

(10) Patent No.: US 10,974,300 B2
(45) Date of Patent: Apr. 13, 2021

(54) METHOD OF MANUFACTURING BORON COATED STRAWS FOR NEUTRON DETECTION THROUGH SPIRAL WINDING AND WELDING

(71) Applicant: Proportional Technologies, Inc., Houston, TX (US)

(72) Inventor: Jeffrey L. Lacy, Houston, TX (US)

(73) Assignee: Proportional Technologies, Inc., Houston, TX (US)

( * ) Notice: Subject to any disclaimer, the term of this patent is extended or adjusted under 35 U.S.C. 154(b) by 588 days.

(21) Appl. No.: 15/603,233

(22) Filed: May 23, 2017

(65) Prior Publication Data

US 2018/0021827 A1 Jan. 25, 2018

Related U.S. Application Data

(60) Provisional application No. 62/340,368, filed on May 23, 2016.

(51) Int. Cl.

| | | |
|---|---|---|
| *B21C 37/12* | (2006.01) | |
| *B23K 26/30* | (2014.01) | |
| *B23K 26/08* | (2014.01) | |
| *G01T 3/00* | (2006.01) | |
| *B23K 26/322* | (2014.01) | |
| *B23K 103/08* | (2006.01) | |
| *B23K 103/16* | (2006.01) | |

(Continued)

(52) U.S. Cl.
CPC .......... *B21C 37/122* (2013.01); *B21C 37/126* (2013.01); *B23K 26/0823* (2013.01); *B23K 26/0838* (2013.01); *B23K 26/0884* (2013.01); *B23K 26/30* (2013.01); *B23K 26/322* (2013.01); *G01T 3/00* (2013.01); *B23K 2101/34* (2018.08); *B23K 2101/36* (2018.08); *B23K 2103/08* (2018.08); *B23K 2103/166* (2018.08)

(58) Field of Classification Search
CPC .......... B23K 2103/08; B23K 2103/166; B23K 26/322; B23K 2104/34; B23K 2101/36; B23K 26/0823; B23K 26/0884; B23K 26/30; B23K 26/0838; G01T 3/00; B21C 37/122
USPC .......................................................... 219/62
See application file for complete search history.

(56) References Cited

U.S. PATENT DOCUMENTS

| | | | |
|---|---|---|---|
| 3,860,845 A | 1/1975 | Gleason et al. | |
| 4,238,088 A * | 12/1980 | Schoettle | ............ G11B 15/295 242/352.3 |

(Continued)

FOREIGN PATENT DOCUMENTS

| | | | | |
|---|---|---|---|---|
| WO | WO-2016170224 A1 * | 10/2016 | ............ | G01B 21/22 |
| WO | WO-2017035729 A1 * | 3/2017 | ........... | B23K 26/322 |

OTHER PUBLICATIONS

J.L. Lacy, et al, "The Evolution of Neutron Straw Detector Applications in Homeland Security", IEEE Transactions on Nuclear Science, Apr. 2013, vol. 60, No. 2, pp. 1140-1146.

*Primary Examiner* — Dana Ross
*Assistant Examiner* — Kuangyue Chen
(74) *Attorney, Agent, or Firm* — Hasley Scarano, L.L.P.

(57) ABSTRACT

A method and apparatus are disclosed with a continuous straw forming process for spiral winding boron-coated foil into a rounded tube or cylinder with an overlap and tight contact between the spiral edges, and a welding process utilizing a high precision fiber laser to weld the spiral seem forming a straw tube.

15 Claims, 8 Drawing Sheets

(51) Int. Cl.
*B23K 101/36* (2006.01)
*B23K 101/34* (2006.01)

(56) References Cited

U.S. PATENT DOCUMENTS

| | | | |
|---|---|---|---|
| 7,002,159 | B2 | 2/2006 | Lacy |
| 7,964,852 | B2 | 6/2011 | McCormick |
| 8,330,116 | B2 | 12/2012 | Lacy |
| 8,519,350 | B2 | 8/2013 | McGregor et al. |
| 8,569,710 | B2 | 10/2013 | Lacy |
| 8,907,293 | B2 | 12/2014 | Lacy |
| 8,941,075 | B2 | 1/2015 | Lacy |
| 9,213,111 | B2 | 12/2015 | Lacy |
| 9,218,946 | B2 | 12/2015 | Lacy |
| 2005/0205798 | A1 | 9/2005 | Downing et al. |
| 2006/0226128 | A1* | 10/2006 | Otsuka ............... B23K 26/0884 219/121.64 |
| 2007/0114213 | A1* | 5/2007 | Chen ..................... B23K 26/04 219/121.75 |
| 2010/0258734 | A1 | 10/2010 | McCormick et al. |
| 2011/0272570 | A1 | 11/2011 | Xu et al. |
| 2012/0217406 | A1 | 8/2012 | McGregor et al. |
| 2014/0072438 | A1* | 3/2014 | Bruck .................. B23K 26/082 416/223 R |
| 2014/0110247 | A1 | 4/2014 | Lacy |
| 2014/0110593 | A1* | 4/2014 | Lacy ................... B23K 31/027 250/390.01 |
| 2018/0214983 | A1* | 8/2018 | Yang ................... B23K 26/082 |

\* cited by examiner

METHOD OF MANUFACTURING BORON COATED STRAWS FOR NEUTRON DETECTION THROUGH SPIRAL WINDING AND WELDING

RELATED APPLICATIONS

This application claims priority to U.S. Provisional Application No. 62/340,368 ("the '368 Application") filed May 23, 2016. The '368 Application is hereby incorporated by reference in its entirety for all purposes, including but not limited to, all portions describing the straw manufacturing process and equipment of the present invention and those specific embodiments disclosed, those portions describing boron-coated straw detectors in general as background and for use with specific embodiments of the present invention, and those portions describing other aspects of manufacturing and testing of boron-coated straws that may relate to the present invention.

GOVERNMENTAL SPONSORSHIP

This invention was made with support under HDTRA-1-14-C-0047 awarded by the Defense Threat Reduction Agency and under contract HR0011-14-C-0096 awarded by Defense Advanced Research Projects Agency. The government may have certain rights in the invention.

REFERENCE TO A SEQUENTIAL LISTING

Not applicable.

BACKGROUND OF THE INVENTION

Field of the Invention

This invention relates to manufacturing neutron detectors. More particularly, this invention relates to a system and method of manufacturing boron-coated straw detectors using spiral winding of boron-coated film and laser welding.

Description of the Related Art

After the 9/11 terrorist attacks in the US and later attacks around the world, concerns about terrorist nuclear attacks have drastically escalated, leading to the deployment of thousands of large neutron detectors around the world to screen for nuclear weapons or nuclear weapon grade raw materials. On the other hand, the worldwide supply of the gold standard of the neutron detection medium, the precious $^3$He gas, has sharply dropped over the years. These scenarios have led to the immediate requirement of an alternative technology that can address both of these emerging issues, specifically the mass production of new detectors in a cost effective manner and performance equal to or better than a comparable $^3$He based system.

Boron-coated straw detector technology was first patented by. Dr. Lacy in U.S. Pat. No. 7,002,159 entitled "Boron-Coated Straw Neutron Detector" based upon a Nov. 13, 2002, filing that addressed this favorable alternative to $^3$He detectors. As the thought leader of this technology area, Dr. Lacy continued his research and development to improve the boron coated straw detectors technology and to find new uses. Examples of Dr. Lacy's continued progress in this technology area are found in his other issued patents and pending patent applications which include: U.S. Pat. No. 8,330,116 entitled "Long Range Neutron-Gamma Point Source Detection and Imaging Using Rotating Detector"; U.S. Pat. No. 8,569,710 entitled "Optimized Detection of Fission Neutrons Using Boron-Coated Straw Detectors Distributed in Moderator Material"; U.S. Pat. No. 8,907,293, entitled "Optimized Detection of Fission Neutrons Using Boron-Coated Straw Detectors Distributed in Moderator Material"; U.S. Pat. No. 9,218,946 entitled "Sealed Boron-Coated Straw Detectors"; U.S. Pat. No. 9,213,111 entitled "Neutron Detectors for Active Interrogation"; U.S. Pat. No. 8,941,075, entitled "Boron Coated Straw Detectors with Shaped Straws"; U.S. application Ser. No. 14/060,015 filed Oct. 22, 2013, entitled "Method and Apparatus for Coating Thin Foil with a Boron Coating"; U.S. application Ser. No. 14/060,507 filed Oct. 22, 2013, entitled "Method and Apparatus for Fabrication Boron Coated Straws for Neutron Detectors"; U.S. application Ser. No. 14/938,903 filed Nov. 12, 2015 entitled "Method of Accurate Thickness Measurement of Boron Carbide Coating on Copper Foil"; and U.S. application Ser. No. 14/939,296 filed Nov. 12, 2015, entitled "Moving Magnet Assembly to Increase the Utility of a Rectangular Magnetron Sputtering Target." The patent and pending applications mentioned in this paragraph are hereby incorporated by reference in their entirety for all purposes, including but not limited to those portions describing the structure and technical details of the boron-coated straw detectors and boron coating as background and for use as specific embodiments of the present invention, and those portions describing other aspects of manufacturing and testing of boron-coated straws that may relate to the present invention.

Dr. Lacy also widely published articles on boron-coated straw detection capabilities, fabrication, and development of prototypes for various applications including:

J. L. Lacy, et al, "Novel neutron detector for high rate imaging applications", *IEEE Nuclear Science Symposium Conference Record*, 2002, vol. 1, pp. 392-396;

J. L. Lacy, et al, "Straw detector for high rate, high resolution neutron imaging", in *IEEE Nuclear Science Symposium Conference Record*, 2005, vol. 2, pp. 623-627;

J. L. Lacy, et al, "High sensitivity portable neutron detector for fissile materials detection", *IEEE Nuclear Science Symposium Conference Record*, 2005, vol. 2, pp. 1009-1013;

J. L. Lacy, et al, "Performance of 1 Meter Straw Detector for High Rate Neutron Imaging", *IEEE Nuclear Science Symposium Conference Record*, 2006, vol. 1, pp. 20-26;

J. L. Lacy, et al, "Long range neutron-gamma point source detection and imaging using unique rotating detector", *IEEE Nuclear Science Symposium Conference Record*, 2007, vol. 1, pp. 185-191;

J. L. Lacy, et al, "Fabrication and materials for a long range neutron-gamma monitor using straw detectors", *IEEE Nuclear Science Symposium Conference Record*, 2008, pp. 686-691;

J. L. Lacy, et al, "One meter square high rate neutron imaging panel based on boron straws", *IEEE Nuclear Science Symposium Conference Record*, 2009, pp. 1117-1121;

J. L. Lacy, et al, "Boron coated straw detectors as a replacement for $^3$He", *IEEE Nuclear Science Symposium Conference Record*, 2009, pp. 119-125;

J. L. Lacy, et al, "One meter square high rate neutron imaging panel based on boron straws", *IEEE 2009 Nuclear Science Symposium Conference Record*, 2009, pp. 1117-1121;

J. L. Lacy, et al, "Initial performance of large area neutron imager based on boron coated straws", *IEEE 2010 Nuclear Science Symposium Conference Record*, 2010, pp. 1786-1799;

J. L. Lacy, et al, "Initial performance of sealed straw modules for large area neutron science detectors", *IEEE 2011 Nuclear Science Symposium Conference Record*, 2011, pp. 431-435;

J. L. Lacy, et al, "Straw-Based Portal Monitor $^3$He Replacement Detector with Expanded Capability", *IEEE 2011 Nuclear Science Symposium Conference Record*, 2011, pp. 431-435;

J. L. Lacy, et al, "Performance of a Straw-Based Portable Neutron Concidence/Multiplicity Counter", *IEEE 2011 Nuclear Science Symposium Conference Record*, 2011, pp. 529-532;

J. L. Lacy, et al, "Replacement of $^3$He in Constrained-Volume Homeland Security Detectors", *IEEE 2011 Nuclear Science Symposium Conference Record*, 2011, pp. 324-325;

J. L. Lacy, et al, "Initial performance of sealed straw modules for large area neutron science detectors", *IEEE 2011 Nuclear Science Symposium Conference Record*, 2011, pp. 431-435;

J. L. Lacy, et al, "Boron-coated straws as a replacement for 3He-based neutron detectors", *Nuclear Instruments and Methods in Physics Research*, Vol. 652, 2011, pp. 359-363;

J. L. Lacy, et al, "Design and Performance of High-Efficiency Counters Based on Boron-Lined Straw Detectors", *Institute of Nuclear Materials Management Annual Proceedings*, 2012;

J. L. Lacy, et al, "Boron-coated straw detectors of backpack monitors", *IEEE Transactions on Nuclear Science*, Vol. 60, No. 2, 2013, pp, 1111-1117.

J. L. Lacy, et al, "The Evolution of Neutron Straw Detector Applications in Homeland Security", *IEEE Transactions on Nuclear Science*, Vol. 60, No. 2, 2013, pp. 1140-1146. The publications mentioned in this paragraph are hereby incorporated by reference in their entirety for all purposes, including but not limited to those portions describing the structure and technical details of the boron-coated straw detectors and boron coatings as background and for use as specific embodiments of the present invention, and those portions describing other aspects of manufacturing and testing of boron-coated straws that may relate to the present invention.

BCS based neutron detectors consist of a Cu straw coated on the inside with a thin layer of 10B-enriched boron carbide (10B4C). Thermal neutrons captured in the 10B layer are converted into Li and α particles with respective kinetic energies of 1.47 and 0.84 MeV, which are emitted in exactly opposite directions from the neutron capture location with isotropic distribution. For optimal $^{10}B_4C$ thickness, typically 1 µm, one of the two charged particles escapes the wall with 78% probability and ionizes the counting gas contained within the straw. If an appropriate potential is applied between the straw wall and the central anode wire, the straw acts as a proportional counter similar to the $^3$He detectors.

SUMMARY OF THE INVENTION

A method and apparatus are disclosed with a continuous straw forming process for spiral winding boron-coated foil into a rounded tube or cylinder with an overlap and tight contact between the spiral edges, and a welding process utilizing a high precision fiber laser to weld the spiral seem forming a straw tube.

A method and apparatus for manufacturing boron-coated straws for use in neutron detector systems is disclosed comprising the steps of spiral wrapping boron-coated foil tape from a spool onto a mandrel, moving the foil along the mandrel, laser welding the spiral seam to form the straw, and cutting the straw into the desired length. Preferably, the system is automated and integrated such that the process winds the tape, welds the seam, and cuts the straw through a signal integrated work station that minimizes operator intervention. A preferred embodiment of the system for implementing the process includes a tension controlled reel for supplying coated foil, a mandrel having an outside diameter near the preferred diameter of the straw to be manufactured, a motor driven belt system for advancing the foil and providing a consistent overlap of the spirally wound foil edges, a laser welding system for welding the tube seem together, a velocity meter for precisely measuring the rate the tube progresses, and a cutting system for automatically cutting the straw into the preferred lengths.

Additional advantages of the invention are set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF SEVERAL VIEWS OF THE DRAWINGS

A better understanding of the invention can be obtained when the detailed description set forth below is reviewed in conjunction with the accompanying drawings, in which.

DETAILED DESCRIPTION OF VARIOUS EMBODIMENTS OF THE INVENTION

A method and apparatus for manufacturing boron-coated straws for use in neutron detector systems is disclosed comprising the steps of spiral wrapping boron-coated copper tape from a spool onto a mandrel, moving the copper tape along the mandrel, laser welding the seam to form the straw, and cutting the straw into the desired length. Preferably, the system is automated and integrated such that the process winds the tape, welds the seam, and cuts the straw through a signal integrated work station that minimizes operator intervention. A preferred embodiment of the system for implementing the process includes a tension controlled reel for supplying coated foil, a mandrel having an outside diameter near the preferred diameter of the straw to be manufactured, a motor driven belt system for advancing the foil and providing a consistent overlap of the spirally wound foil edges, a laser gelding system for welding the tube seem together, a velocity meter for precisely measuring the rate the tube progresses, and a cutting system for automatically cutting the straw into the preferred lengths.

Figure 1:
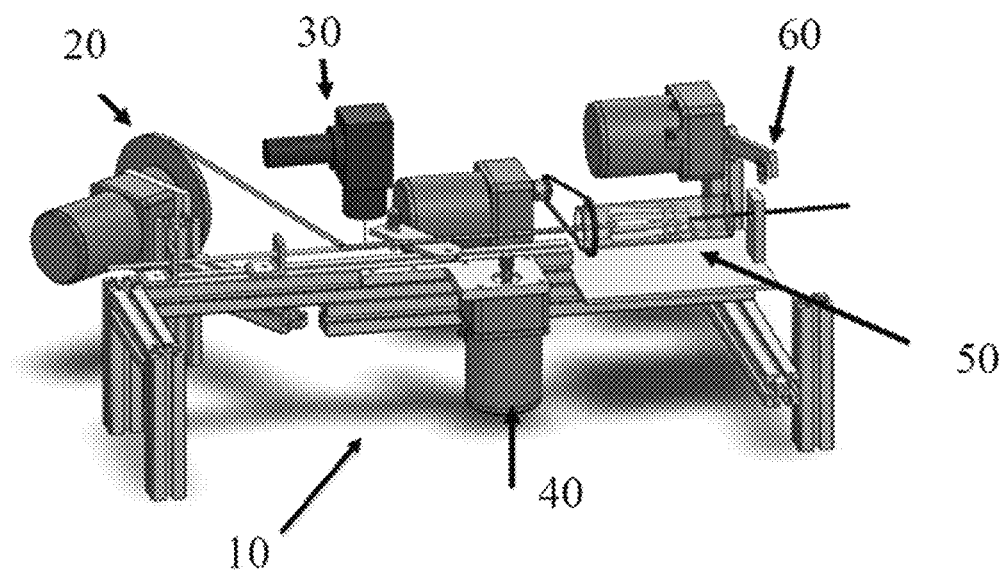
FIG. 1 depicts a perspective view of a partial embodiment of an apparatus for implement the boron coated straw manufacturing process.
Figure 2:
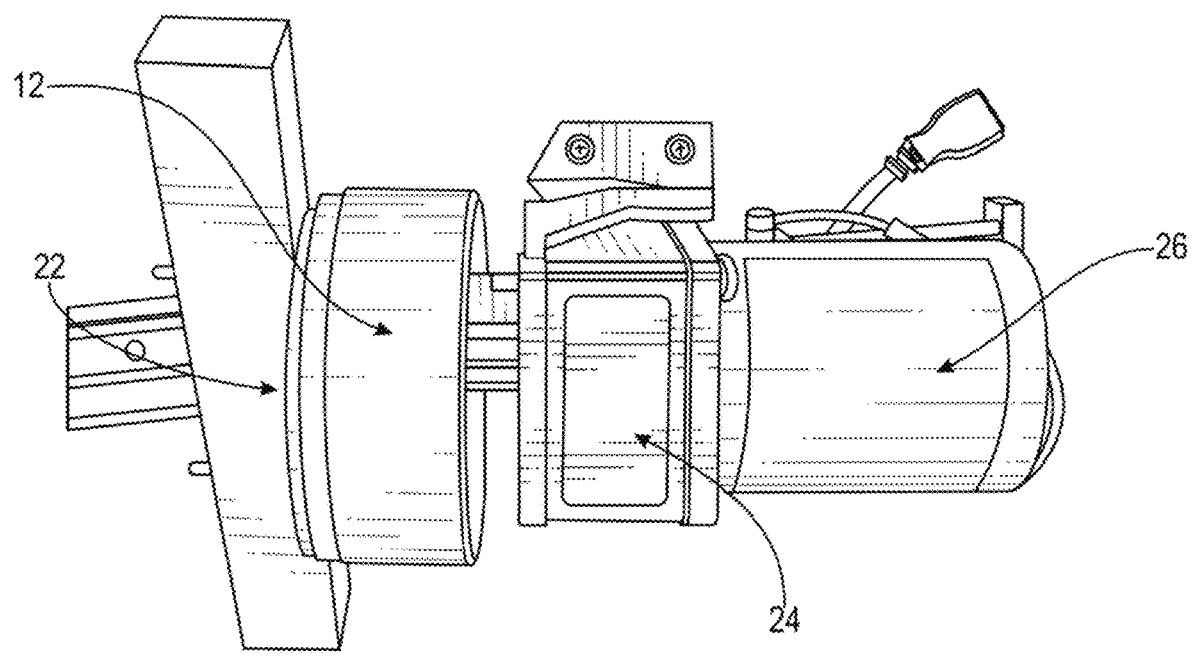
FIG. 2 depicts an embodiment of a foil supply system for use with the straw manufacturing process.
Figure 4:
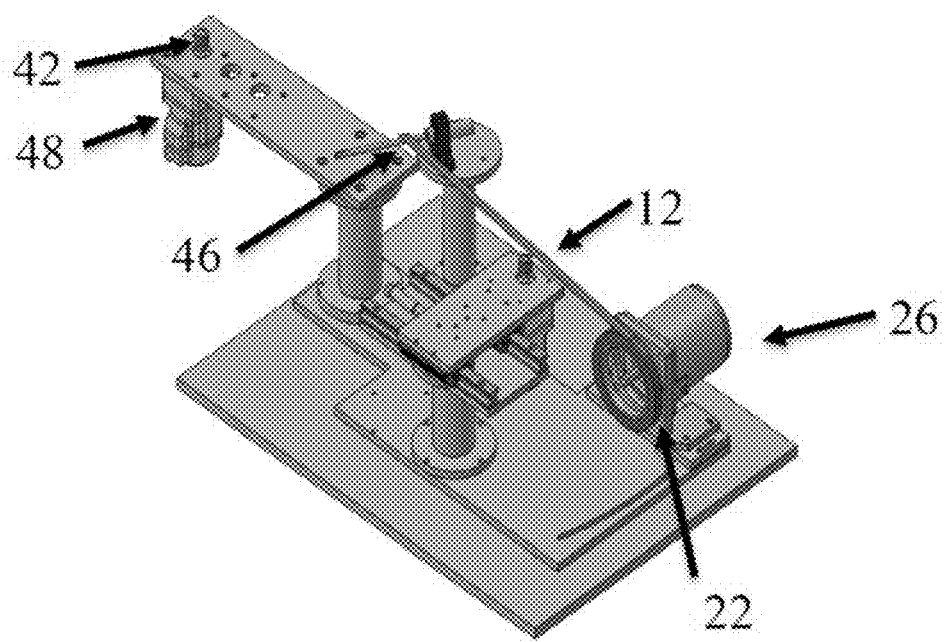
FIG. 4 depicts a perspective view of a partial embodiment of an apparatus to implement the straw manufacturing process.
Figure 5:
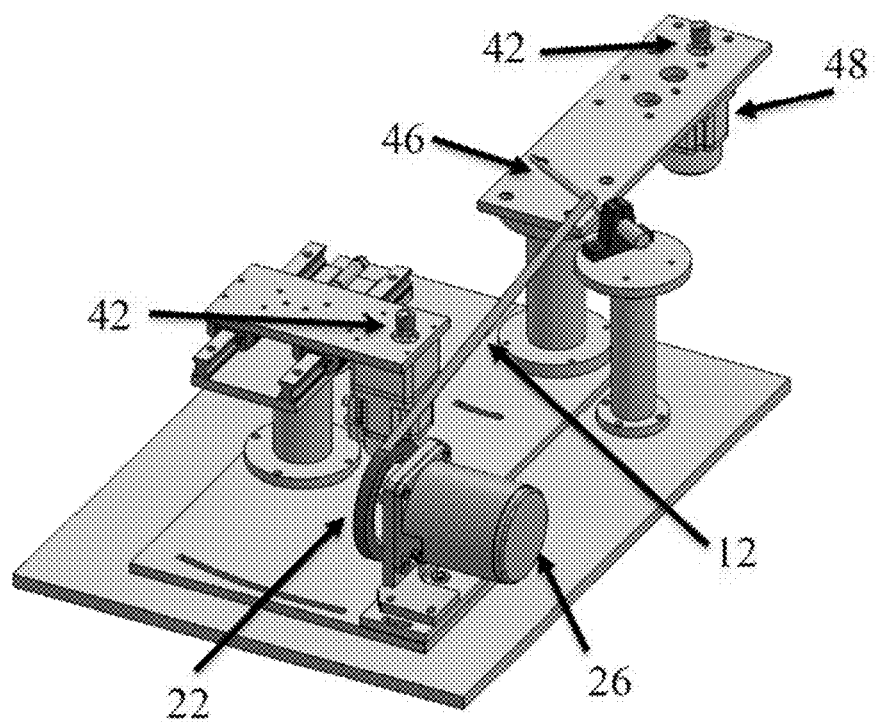
FIG. 5 depicts an opposite perspective view of the partial embodiment of FIG. 4.

Preferably, the process begins as boron coated foil 12 is drawn from a foil supply system 20 using a belt system 40. As shown in FIGS. 2, 4, and 5, in the foil supply system 20, coated foil 12 is supplied from a continuous reel 22. Preferably, foil supply reel 22 is coupled to a tension motor 26 to provide forcible pull down of the top and bottom foil layers assuring excellent contact. A gear box 24, preferably having a gear ratio of about 18:1, may be utilized.

Figure 6:
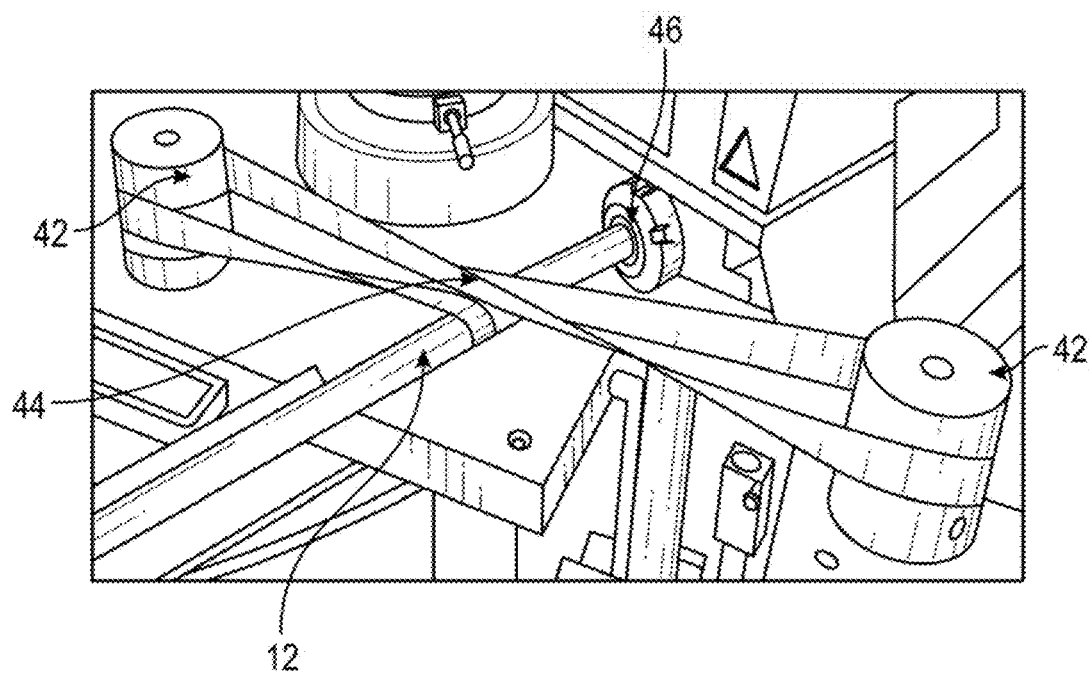
FIG. 6 depicts an embodiment of belt or forming system or use with the straw manufacturing process.
Figure 7:
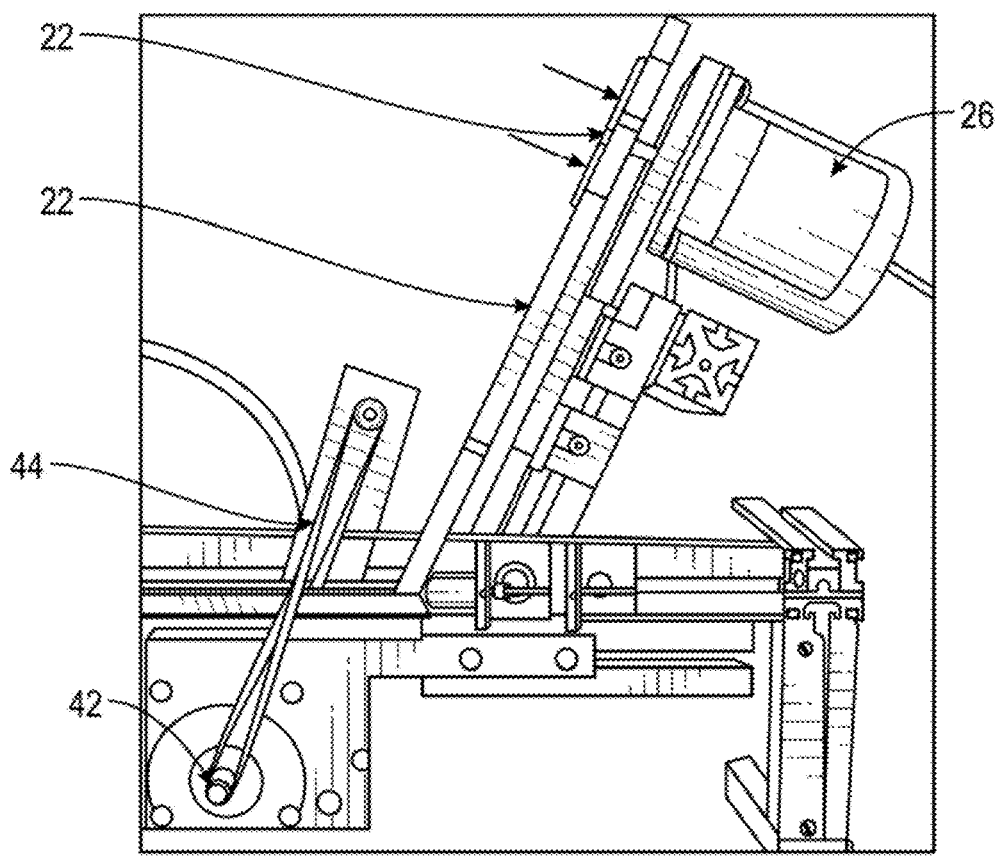
FIG. 7 depicts a top view of an embodiment of straw forming process for use with the straw manufacturing process.
Figure 8:
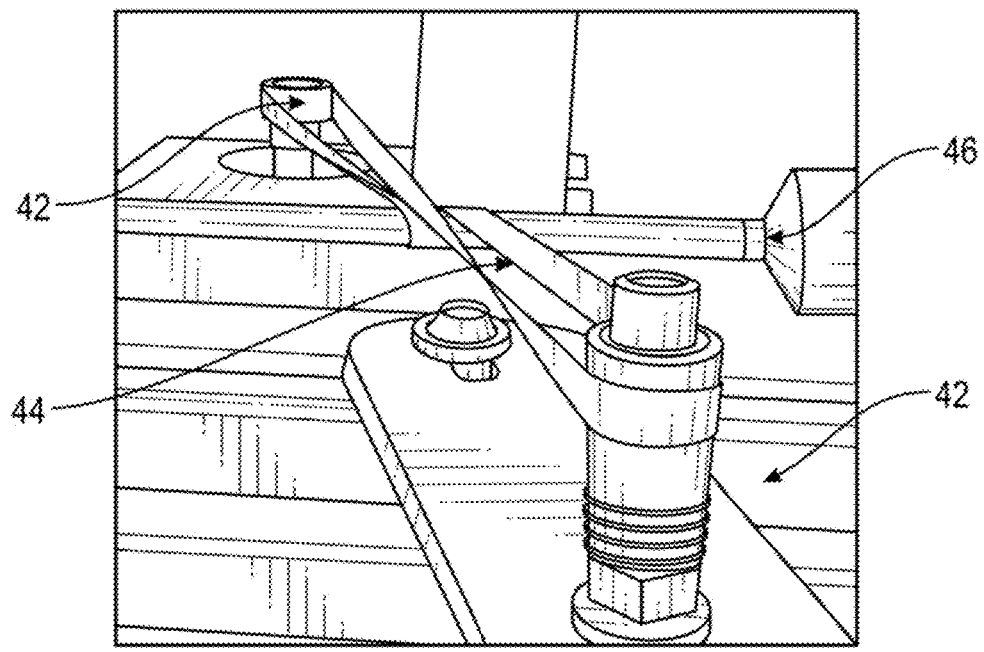
FIG. 8 depicts an embodiment of a belt forming system for use with the straw manufacturing process.

As shown in FIGS. 6, 7, and 8, when the foil exits from the reel 22, it is then preferably drawn from the reel 22 using a belt system driven 40 by two capstans 42 powered by drive motor 48. The belt 44 is wrapped around the straw size central mandrel 46 on top of the overlapped foil 12 and rotates and translates the foil 12 around the fixed mandrel 46 forming a high precision overlap for welding. Preferably, the foil 12 has an overlap width of less than about 1 millimeter at the point where the welding laser is directed, and more preferably an overlap with of less than about 0.5 millimeters. Preferably, mandrel 46 is interchangeable to allow manufacture of different diameter straws as may be needed in different applications. Preferably, mandrel 46 has a diameter approximately equal to the inside diameter of the straws to be manufactured.

Figure 3:
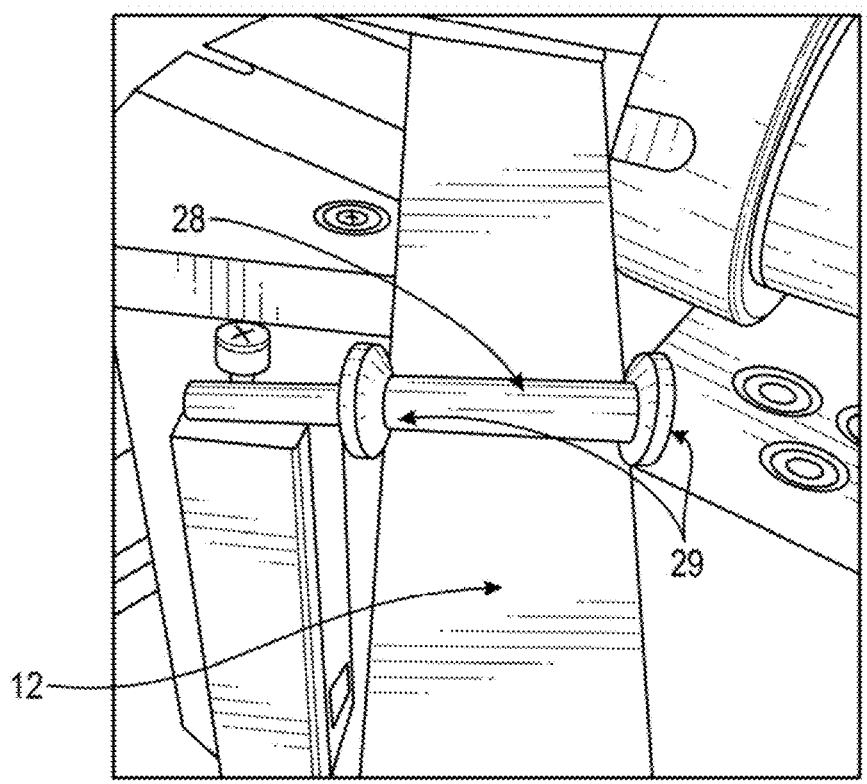
FIG. 3 depicts an embodiment of a foil guide for use with the straw manufacturing process.

To ensure the foil can be transported smoothly accurately to the mandrel without operator intervention, a guide pin 28 for the foil may be utilized as shown in FIG. 3. The guide pin may be machined from a steel rod with beveled guide edges 29 on each end of the pin 28. The width between these guide edges 29 preferably matches the width of the foil being utilized. This simple mechanical guide 28 prevents the foil overlap variation and relieves the need for constant operator intervention. In preferred embodiments, a dual-motor-drive system, and system for constant belt tension provide flexibility for the foil feed and high accuracy of the laser welding position.

Figure 9:
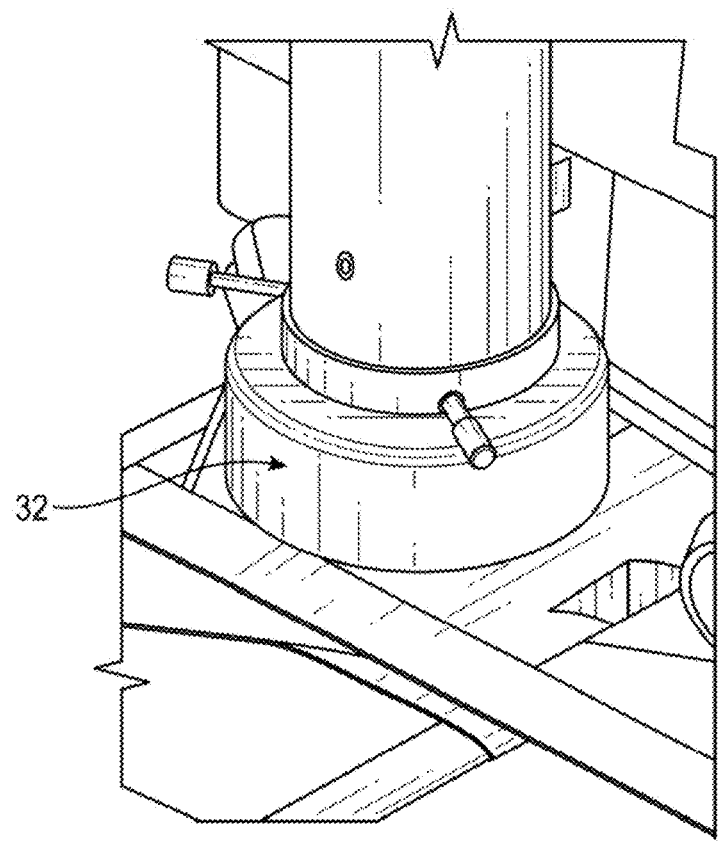
FIG. 9 depicts a partial embodiment of a laser welding system for use with the straw manufacturing process.
Figure 10:
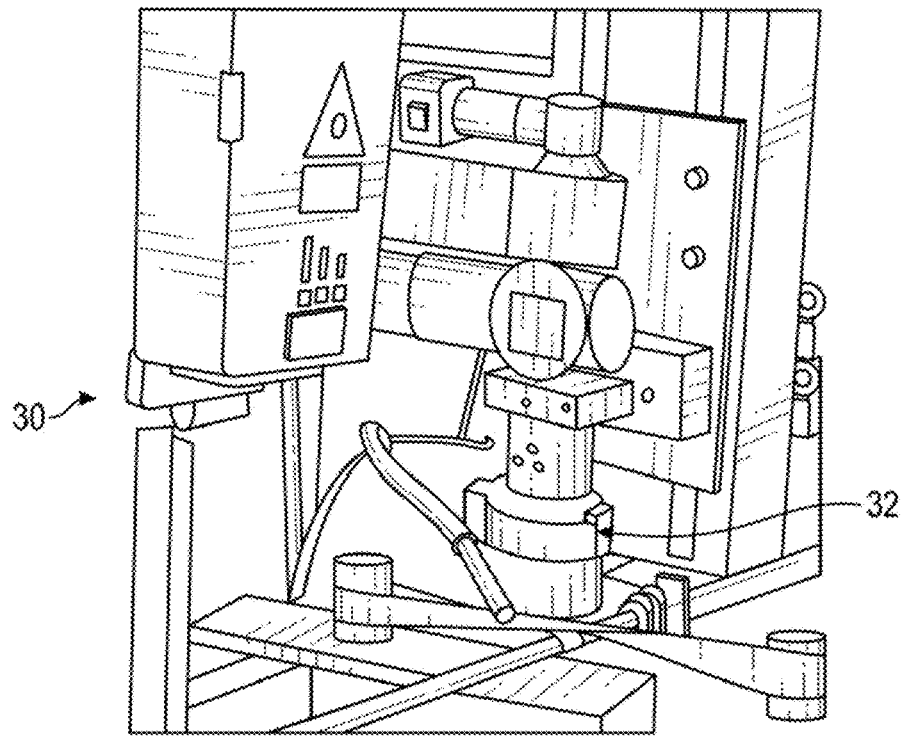
FIG. 10 depicts a partial embodiment of a laser welding system for use with the straw manufacturing process.
Figure 11:
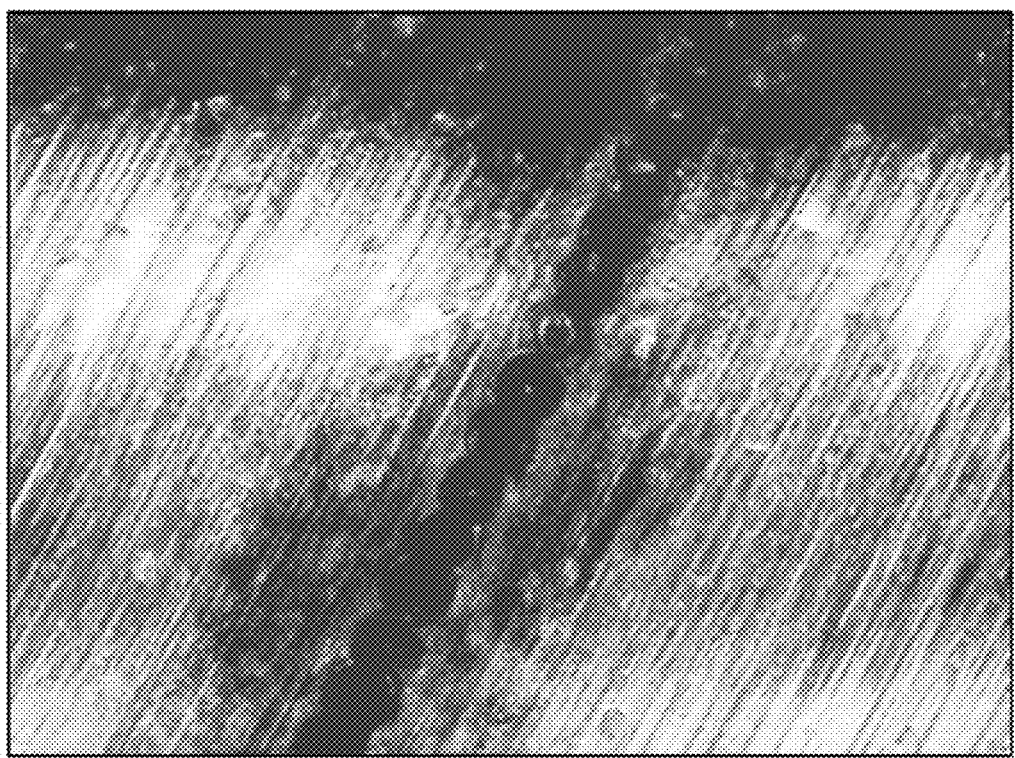
FIG. 11 depicts a photograph a of welded seem manufactured utilizing an embodiment of the straw manufacturing process.
Figure 12:
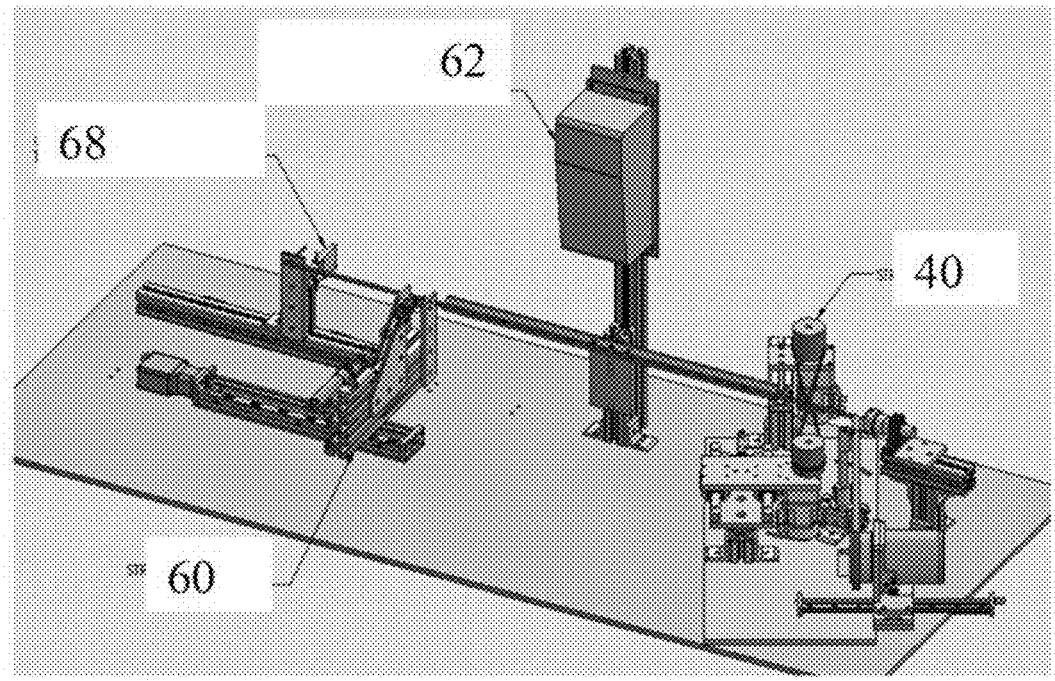
FIG. 12 depicts a perspective view of a partial embodiment including a system for cutting tubes that can be utilized with the straw manufacturing process.

After the foil 12 is spirally wrapped around mandrel 46 and preferably after the foil 12 emerges from the belts 44, a round tube has been formed and the overlapping seems are then welded. Laser welding though ideal for actual joining requires very intimate contact between the two foils being joined such as is provided by the spiral tube forming process. As shown in FIGS. 9 and 10, a high power microscopic fiber laser machine 30 is utilized to preferably continuously weld the overlapping seams producing a completely formed straw. As shown in FIG. 11, the high power microscopic fiber laser machine 30 preferably produces a very high intensity weld spot of dimension comparable to foil thickness. Laser machine 30 preferably is deployed to achieve continuous welding operation through application of energy as very brief pulses with frequencies of up to 100 Hz at energy as required to melt the two layers of copper into each other. Preferably, a very intense YAG Laser with tiny spot size of the order of foil thickness is utilized as the laser 30. In one embodiment, the laser 30 utilizes 25 µm weld spots produced by an extremely intense YAG Fiber laser pulses. A precisely positioned fiber welding laser 30 can fire at 260 Hz to weld the two layers of foil together and create an almost continuous spiral seem along the straw. The beam easily melts through the top foil layer dissolving the Boron Carbide layer on the underside into the top of the underneath copper layer producing a very strong continuous spiral joint. In one embodiment, a Rofin/Lasag 150 W fiber coupled diode laser can be utilized to perform the automatic straw tube welding. The weld spot can be a fixed location on the top of the mandrel. A 3-axis motion control system is preferably utilized to manipulate the weld head 32 to 0.00025" precision. The Rofin Welding laser (Rofin/Lasag LFS 150) is a factory floor capable machine providing 24/7 operation with a mean time to failure on the order of 10 years.

In a preferred embodiment, a star forming die can be integrated with the process to shape the round straw into a star shape or other desired shapes.

Figure 13:
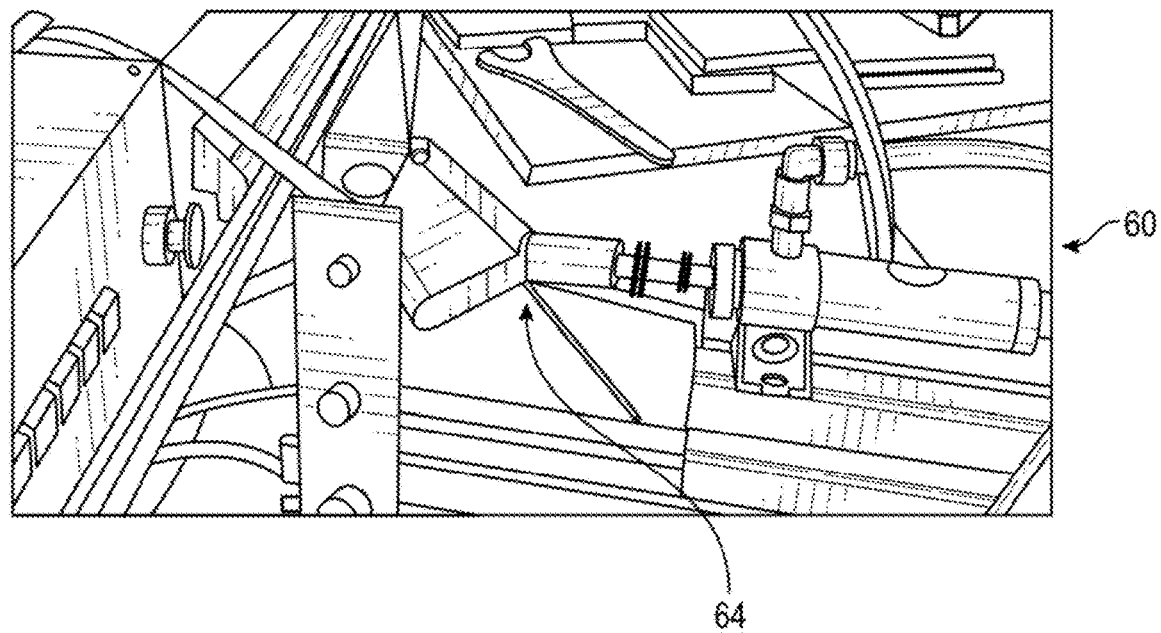
FIG. 13 depicts an embodiment of a cutting system for use with the straw manufacturing process.

Once the boron coated straw tube has been formed, it can be cut into lengths desired for a particular detector system. Preferably, a straw cutting tool 60 is integrated into the process so the straws can be automatically cut to any desired length as part of the continuous process. The straw cutting process can be important because the very thin walled foil tube is difficult to cut with precision. As shown in FIG. 13, the newly formed tube can preferably be cut with a very rapid translating scissor action such as can be achieved with and air driven cutter 64. In preferred embodiments, a laser velocimeter 62 can monitor the velocity of the newly formed tube very precisely and integrates to obtain live time measure of the tube passing the cutter 64 since the last cut. Preferably, a laser velocity/length meter 62 is employed for cut length measurement in real time. An optical sensor 68 may also be utilized to control length. On example of an acceptable laser velocity system is the Polytec LSV-1000 Laser Surface Velocimeter. Preferably, meter 62 determines the length that has passed from the previous cut point and sends a signal to the air driven cutter 64. Preferably, the cutting system 60 can be reconfigured quickly to output any diameter or length of cut. Preferably, the variations of finished straw lengths are smaller than about 0.01".

Figure 14:
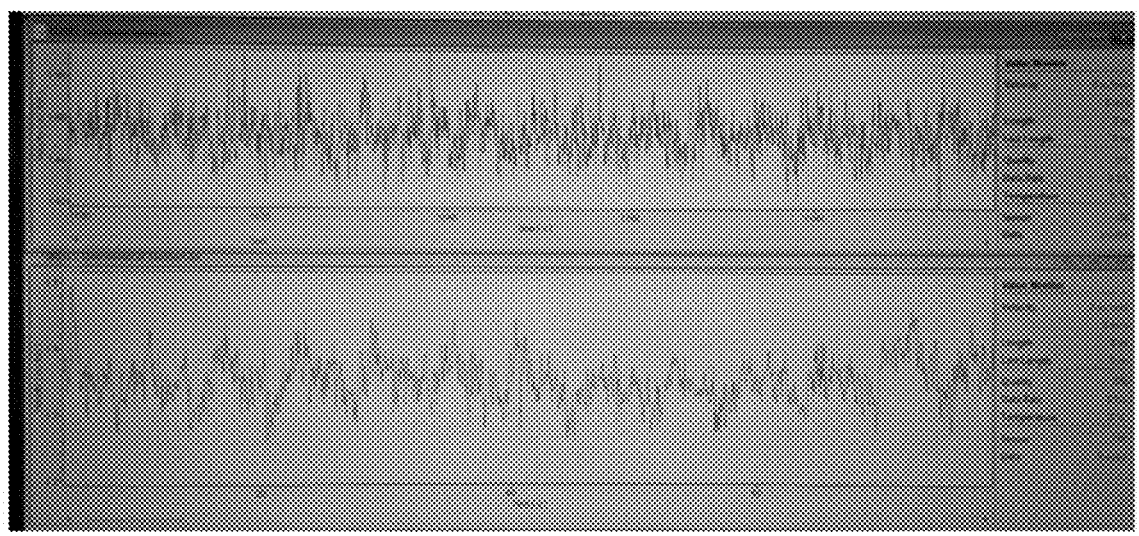
FIG. 14 depicts a photograph of electronic results comparing variations in length between embodiments of the straw manufacturing process.

Preferably, a gear box 24 having a ratio 18:1 can be utilized to reduce the vibration and maintain the tension on the foil 12. Utilizing this gear box 24, the length variation of the 36" straws cut by the laser machine was found to be within 1 mm and accuracy of the cutting operation was improved significantly to +/−0.04". As shown in FIG. 2, a brass rod can be attached to dampen the vibration of the tension motor 26. In one embodiment, this mechanical design improved our length variations from +/−1.3% of the total length to +/−0.11%. The stated accuracy of the laser velocity meter unit in ideal conditions is 0.05% of the total length, and preferred embodiments of the process can approach the stated accuracy of this device. As shown in FIG. 14, the LSV measurements (top) utilizing these preferred features of this paragraph and previous measurements (bottom) demonstrate that the max variation of the velocity measurements is much lower using the gear box 24 and the brass rod.

Figure 15:
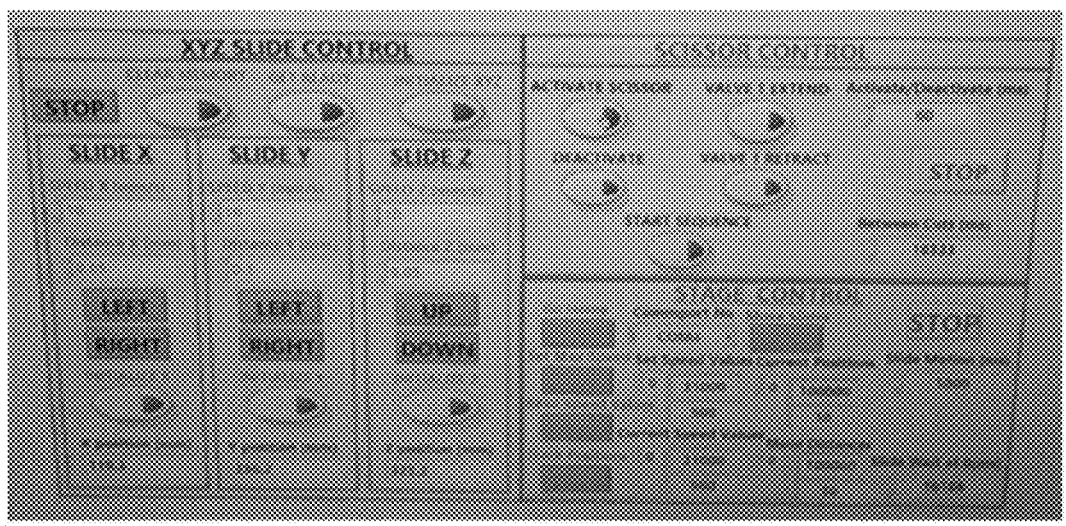
FIG. 15 depicts an example visual display for an embodiment of the straw manufacturing process having a single process control system.

Preferably, the straw forming, laser welding systems, and cutting systems are automated and can be controlled by a single process control system. An example of a single automated control system visual display is shown in FIG. 15.

In experimental testing, embodiments of this new manufacturing process have achieved automatic production that can deliver the finished straw continuously with little monitoring and without the need for highly skilled technicians. Straw production rates utilizing the present process can be up to 3 meter per minute, and more preferably as high as 10 meters per minute. This compares to prior processes for forming boron coated straws which had production rates at just 10 meters per hour for 15 millimeter diameter straws. At the same time the stability and accuracy of the process can become routinely very stable and accurate providing virtually unattended operation. The laser welding operation accelerates the previous weld seam rate of ultrasonic welding more than two-fold with a future probable rate and has increased production rate by 20-fold. Preferably, the automatic straw tube forming process can manufacture 90 straws within 0.8 hour, and significantly reduce the labor cost, and also reduce the manufacturing time for this process from 10 hours to 0.8 hour, for each VMD unit.

While the terms used herein are believed to be well-understood by one of ordinary skill in the art, definitions are set forth to facilitate explanation of certain of the presently-disclosed subject matter.

Following long-standing patent law convention, the terms "a", "an", and "the" refer to one or more when used in this application, including the claims. Thus, for example, reference to "a window" includes a plurality of such windows, and so forth.

Unless otherwise indicated, all numbers expressing quantities of elements, dimensions such as width and area, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of a dimension, area, percentage, etc., is meant to encompass variations of in some embodiments plus or minus 20%, in some embodiments plus or minus 10%, in some embodiments plus or minus 5%, in some embodiments plus or minus 1%, in some embodiments plus or minus 0.5%, and in some embodiments plus or minus 0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter. With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, S, C, and/or O" includes A, S, C, and O individually, but also includes any and all combinations and subcombinations of A, S, C, and O.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. The foregoing disclosure and description are illustrative and explanatory thereof, and various changes in the details of the illustrated apparatus and construction and method of operation may be made without departing from the spirit in scope of the invention which is described by the following claims.

We claim:

1. An improved process for forming boron coated straws for use in neutron detectors comprising the steps of:
    providing a reel of boron-coated film, a fixed, elongated mandrel having an outside diameter approximately equal to the desired inside diameter of the straws to be formed; and a laser welding system;
    providing a belt drive system comprising at least one belt and two motor driven capstans;
    spiral winding the boron-coated film around the elongated mandrel such that the boron-coating is adjacent to the mandrel and the outside edges of each wind of film overlaps the previous wind by no more than 1 millimeter;
    wrapping the belt around the mandrel on top of the overlapped film;
    rotating the spirally wound and overlapping film about the mandrel and advancing the film down the mandrel by rotating the belt using the motor driven capstans to rotate and advance the spiral wound film;
    welding the overlapped edge of the spirally wound film to form a seam using the laser welding system as the film advances down the mandrel thereby creating a cylinder; and
    cutting the cylinder to a desired length thereby forming a boron-coated straw.

2. The process of claim 1, further comprising the steps of:
providing a guide pin having beveled guides on each end, the length of the guide pin being approximately equal to the width of the film; and
guiding the film through the guide pin before spirally winding around the mandrel to ensure consistent overlap of the film.

3. The process of claim 1, wherein the spiral winding step leaves an overlap of the film edges of no more than 0.5 millimeters.

4. The process of claim 1 wherein the laser welding system provided comprises a YAG fiber laser.

5. The process of claim 1 wherein the welding step comprises welding by continuously using spot welds of about 25 µm.

6. The process of claim 1 wherein the laser welding system provided allows 3-axis motion for moving a laser welding head.

7. The process of claim 1 further comprising the steps of:
providing a laser velocimeter; and
measuring the speed at which the newly formed cylinder advances down the mandrel with the laser velocimeter.

8. The process of claim 7 further comprising the step of:
using the speed measurement to determine the proper time to cut the cylinder to achieve the desired length of the straw.

9. The process of claim 8 wherein the cutting the cylinder step occurs at the proper time determined using the speed measurement.

10. The process of claim 1, wherein the cutting step comprises cutting the cylinder with a scissor mechanism.

11. An improved continuous process for forming boron coated straws for use in neutron detectors comprising the steps of:
providing a reel of boron-coated film, an elongated mandrel having an outside diameter approximately equal to the desired inside diameter of the straws to be formed, a belt drive system comprising at least one belt and two motor driven capstans, a laser welding system, a laser velocimeter, and a scissor mechanism for cutting;
spiral winding the boron-coated film around the elongated mandrel such that the boron-coating is adjacent to the mandrel and the outside edge of each wind of film overlaps the previous wind by no more than 0.5 millimeter;
maintaining a tension on the film reel to ensure a forcible backwards pull on the film as it wraps around the mandrel;
wrapping the belt around the mandrel on top of the overlapped film;
rotating the belt using the motor driven capstans to rotate and translate the spirally wound and overlapping film down the mandrel;
welding the overlapped edge of the spirally wound film to form a seam using the laser welding system as the film advances down the mandrel thereby creating a cylinder;
measuring the speed at which the newly formed cylinder advances down the mandrel with the laser velocimeter;
using the speed measurement to determine the proper time to cut the cylinder to achieve the desired length; and
cutting the cylinder with a scissor mechanism at the determined proper time thereby forming a boron-coated straw of the desired length.

12. The process of claim 11, further comprising the steps of:
providing a guide pin having beveled guides on each end, the length of the guide pin being approximately equal to the width of the film; and
guiding the film through the guide pin before spirally winding around the mandrel to ensure consistent overlap of the film.

13. The process of claim 11 wherein the laser welding system provided comprises a YAG fiber laser.

14. The process of claim 11 wherein the welding step comprises welding by continuously using spot welds of about 25 µm.

15. The process of claim 11 wherein the laser welding system provided allows 3-axis motion for moving a laser welding head.

* * * * *